United States Patent [19]

Sakamoto et al.

[11] Patent Number: 4,897,460

[45] Date of Patent: Jan. 30, 1990

[54] CURING AGENT FOR EPOXY RESINS FROM A MIXTURE OF A SUBSTITUTED UREA AND A DICARBOXYLIC ACID

[75] Inventors: Hiroshi Sakamoto; Koji Takeuchi, both of Kawasaki, Japan

[73] Assignee: Ajinomoto Co., Inc., Tokyo, Japan

[21] Appl. No.: 7,672

[22] Filed: Jan. 28, 1987

[51] Int. Cl.[4] .............................. C08G 59/40
[52] U.S. Cl. ..................... 528/113; 528/93; 528/361; 528/363
[58] Field of Search ............ 528/113, 361, 363

[56] References Cited

U.S. PATENT DOCUMENTS

| | | | |
|---|---|---|---|
| 3,294,749 | 12/1966 | Pratt | 528/361 |
| 3,530,095 | 1/1970 | Porret | 528/361 |
| 3,553,166 | 1/1971 | Anderson | 528/361 |
| 3,558,558 | 1/1971 | Porret | 528/361 |

FOREIGN PATENT DOCUMENTS

| | | | |
|---|---|---|---|
| 1950071 | 4/1970 | Fed. Rep. of Germany | 528/113 |
| 47810 | 10/1978 | Japan | 528/113 |

OTHER PUBLICATIONS

Lee and Neville, Handbook of Epoxy Resins, 1967, pp. 11–18.

Primary Examiner—Morton Foelak
Assistant Examiner—Frederick Krass
Attorney, Agent, or Firm—Oblon, Spivak, McClelland, Maier & Neustadt

[57] ABSTRACT

The present invention relates to an one-packed type epoxy resin composition. An object of the present invention is to provide epoxy resin composition which have good compatibility with epoxy resin, exhibit excellent stability during storage and heat stability, can be used at about room temperature over a long period of time and can be rapidly cured at a relatively low temperature upon heating.

11 Claims, No Drawings

CURING AGENT FOR EPOXY RESINS FROM A MIXTURE OF A SUBSTITUTED UREA AND A DICARBOXYLIC ACID

BACKGROUND OF THE INVENTION

(1) Field of the Invention

The present invention relates to a one-packed epoxy resin composition. Epoxy resins in general can be converted into cured matters having excellent mechanical and electrical properties by heating and curing them. They have therefore have been widely used for various molding materials, composite materials, adhesives, etc., An object of the present invention is to provide epoxy resin compositions which have good compatibility with epoxy resins, exhibit excellent stability during storage, can be used at about room temperature over a long period of time and can be rapidly cured at a relatively low temperature upon heating.

(2) Description of the Related Art

As hardeners of epoxy resins, acid anhydrides, boron trifluoride amine complexes or amine compounds, etc. have been generally used. However, hardeners having a relatively high curing temperature such as acid anhydrides or boron trifluoride amine complexes involve drawbacks that they require molding at high temperatures over long periods of time while they have excellent stability during storage. Further boron trifluoride amine complexes involve drawbacks that they are readily inactivated due to their hygroscopic property and tend to affect the efficiency of the hardened product.

On the other hand, hardeners having a relatively rapid hardening rate such as amine compounds can not only provide a shortened period of hardening time for molding but also reduce energy costs due to lowering the hardening temperature and costs of auxiliary materials so that they are greatly advantageous and very valuable from a practical standpoint. However, the amine compounds encounter the problem that the time period over which they are useable as molding materials at about room temperature becomes markedly short and their moldability change in a short period of time so that they are unstable in operability. Furthermore, the amine compounds have a toxic problem in general and cannot be used widely.

SUMMARY OF THE INVENTION

The present invention relates to a one-packed type epoxy resin composition. An object of the present invention is to provide epoxy resin compositions which have good compatibility with epoxy resin, exhibit excellent stability during storage and heat stability, can be used at about room temperature over a long period of time and can be rapidly cured at a relatively low temperature upon heating.

An one-packed epoxy resin composition comprising as essential components (1), (2) and (3) described below:

(1) epoxy resin
(2) an organic dibasic acid represented by:

$$HOOC(CH_2)_mCOOH$$

wherein m is an integer of 4 to 18;

(3) an urea derivative represented by general formula described below:

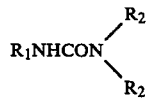

wherein $R_1$ represents hydrogen or an alkyl group or an aromatic group which may have a substituent and $R_2$ represents an alkyl group.

DESCRIPTION OF PREFERRED EMBODIMENTS

As a result of extensive investigations with an attempt to develop potential hardener compositions exhibiting a sufficient storage stability at about room temperature, providing epoxy resins capable of being rapidly cured upon heating even at a relatively low temperature and having excellent compatibility, the present inventors have accomplished the present invention.

Namely, the epoxy resin is directed to epoxy resin compositions comprising:

(1) epoxy resin
(2) an organic dibasic acid represented by:

$$HOOC(CH_2)_mCOOH$$

wherein m is an integer of 4 to 18;

(3) an urea derivative represented by general formula described below:

wherein $R_1$ represents hydrogen or an alkyl group or an aromatic group which may have a substituent and $R_2$ represents a alkyl group.

Effect of the Invention

The one-packed epoxy resin composition of the epoxy resin exhibits excellent stability during storage, provides a prolonged usable time period at about room temperature, relatively readily cured upon heating and provides excellent adhesive property.

The epoxy resins which can be used in the present invention refer to known epoxy resins and specific example include diphenylols such as diphenylolpropane, diphenylolethane, diphenylolmethane, etc., polyglycidyl ethers of alkanes, novolak or polyglycidyl ethers of polyvalent phenols such as resol, poly(epoxyalkyl)ethers of aliphatic polyoxy compounds such as ethylene glycol, glycerine, etc., or glycidyl esters of aromatic and aliphatic carboxylic acids, etc. They may be incorporated singly or in combination of at least two.

The organic dibasic acids which can be used in the present invention are compounds represented by general formula described below:

$$HOOC(CH_2)_mCOOH$$

wherein m is an integer of 4 to 18. Example of the acids include adipic acid, pimelic acid, sebacic acid, suberic acid, azelaic acid, etc.

The amount of the acids to be used is 10 to 100 PHR, preferably approximately 15 to 50 PHR, based on the epoxy resin.

The urea derivatives which can be used in the present invention are not particularly restricted but are compounds represented by general formula described below:

In case where $R_1$ represents an alkyl group, the alkyl group is preferably a lower alkyl group such as a methyl group, an ethyl group, etc.; in case that $R_1$ represents an aromatic group, the aromatic group is preferably a phenyl group; the phenyl group may have at least one substituent such as an alkyl group, e.g., a methyl group or chlorine, bromine, etc. Further $R_2$ preferably represents a lower alkyl group such as a methyl group or an ethyl group. Therefore, preferred examples of hardening accelerators include N,N-dimethylurea, N,N-diethylurea, N-(p-chlorophenyl)-N,N'-dimethylurea, N-(m,p-dichlorophenyl)-N,N'-dimethylurea, etc. These urea derivatives can be used singly or as admixture of two or more. The amount of the urea derivatives to be used is 1 to 30 PHR, desirably 1 to 15 PHR, based on the epoxy resin. The one-packed epoxy resin compositions according to the present invention have excellent storage stability and provides cured products having excellent curability (particularly in adhesive property and peel intensity).

Hereafter the present invention will be described with reference to the example below.

EXAMPLE

Compositions were prepared in accordance with formulations shown in Tables 1 and 2 to evaluate curing property, adhesive property and storage stability.

1. Curing Property

By differential thermal analysis, a temperature at which curing started and a peak temperature were measured.
Sample: about 10 mg
Standard material: alumina
Rate of elevating temperature: 5° C./min 2. Gelation Time Using about 3 g of a sample, a gelation time until the sample was gelled was measured with Yasuda's Gel Time Tester.

3. Adhesive Property

Shearing adhesive force:
A test piece prepared according to JIS K6850 was cured at 130° C./1H and its adhesive force was measured using Tenshiron BANNO Tester (manufactured by Toyo Boldwin K.K.).
Temperature measured: 25° C.
T-Peel Intensity:
A test piece prepared according to JIS K6854 was cured at a given temperature and its T-Peel intensity was measured with Tenshiron BANNO Tester.
Peel intensity: 50 mm/min 4. Storage stability A sample was put in a thermostat of a given temperature and the number of days until the fluidity was lost was counted.

These results are shown in Tables 3 and 4.

TABLE 1

| Formulation | | Example | | | | | Reference | |
|---|---|---|---|---|---|---|---|---|
| | | 1 | 2 | 3 | 4 | 5 | 6 | 7 |
| EP-828 | | 100 | 100 | 100 | 100 | 100 | 100 | 100 |
| HOOC(CH2)mCOOH | m = 4 | 41 | — | — | — | — | 41 | — |
| | m = 6 | — | 47 | — | — | — | — | — |
| | m = 8 | — | — | 55 | — | — | — | — |
| | m = 18 | — | — | — | 50 | 36 | — | 50 |
| DCMU (*1) | | 5 | 5 | 5 | 5 | 5 | — | — |

(*1) N—(m,p-dichrolophenyl)-N',N'-dimethylurea

TABLE 2

| Formulation No. | | Example | | | | | Reference | |
|---|---|---|---|---|---|---|---|---|
| | | 8 | 9 | 10 | 11 | 12 | 13 | 14 |
| EPU-6A (*2) | | 100 | 100 | 100 | 100 | — | 100 | 100 |
| R-1309 (*3) | | — | — | — | — | 100 | — | — |
| HOOC(CH2)$_m$COOH | m = 6 | 38 | — | — | — | — | 41 | — |
| | m = 8 | — | 43 | — | — | — | — | — |
| | m = 18 | — | — | 50 | 36 | 30 | — | 50 |
| DCMU (4*) | | 5 | 5 | 5 | 5 | 5 | — | — |

(*2) Urethane modified epoxy resin
(*3) NBR modified epoxy resin
(*4) N—(m,p-dichlorophenyl)-N',N'—dimethylurea

TABLE 3

| Formulation No. | Example | | | | | Reference | |
|---|---|---|---|---|---|---|---|
| | 1 | 2 | 3 | 4 | 5 | 6 | 7 |
| Initial DSC cured temperature (°C.) | 138 | 135 | 130 | 133 | 135 | N.H. | N.H. |
| Maximum exothermic temperature (°C.) | 155 | 158 | 150 | 154 | 156 | (*7) | |
| Gelation time at 150° C. (Sec.) (*5) | 3000< | 3000< | 787 | 605 | 961 | — | — |
| Shearing adhesion stress (Kg/cm) | 67 | 50 | 52 | 186 | 233 | — | — |
| Strage stability | 1 m< | 1 m< | 1 m< | 1 m< | 1 m< | 1 m< | 1 m< |

TABLE 3-continued

| Formulation No. | Example | | | | | Reference | |
|---|---|---|---|---|---|---|---|
| | 1 | 2 | 3 | 4 | 5 | 6 | 7 |
| (40° C.) | (*6) | | | | | | |

(*5) Cured condition 150° C./1H
(*6) 1 month
(*7) Not hardening

TABLE 4

| Formulation No. | | Example | | | | | Reference | |
|---|---|---|---|---|---|---|---|---|
| | | 8 | 9 | 10 | 11 | 12 | 13 | 14 |
| Initial DSC cured temperature (°C.) | | 135 | 133 | 134 | 132 | 120 | N.H. | N.H. |
| Maximum exothermic temperature (°C.) | | 158 | 157 | 158 | 158 | 158 | (*7) | |
| Friction strength | 110° C./3H | — | 7 | 15 | 18 | — | N.H. | N.H. |
| | 120° C./2H | 12 | 4 | 10 | 15 | 6 | N.H. | N.H. |
| | 150° C./1H | 10 | 15 | 13 | 17 | 5 | N.H. | N.H. |
| | 180° C./1H | — | 15 | 12 | 17 | — | N.H. | N.H. |
| Strage stability (40° C.) | | 1 m< | 1 m< | 1 m< | 1 m< | 1 m< | 1 m< | 1 m< |

(*7) Not Hardening

What we claimed is:

1. A one-packed epoxy resin composition, comprising:
   (1) an epoxy resin;
   (2) an organic dibasic acid of the formula HOOC(CH$_2$)$_m$COOH wherein m is an integer of from 4 to 18;
   (3) a urea derivative of the formula

R$_1$NHCONR$_2$R$_2$ wherein R$_1$ is a hydrogen atom, an alkyl group, an aromatic group, or a substituted aromatic group; and R$_2$ is an alkyl group.

2. The composition of claim 1, wherein said organic dibasic acid is at least one member selected from the group consisting of adipic acid, pimelic acid, sebacic acid, suberic acid, and azelaic acid.

3. The composition of claim 1, wherein said epoxy resin is at least one member selected from the group consisting of glycidyl esters of diphenylols, polyglycidyl ethers of alkanes, polyglycidyl ethers of polyvalent phenols, poly(epoxyalkyl)ethers of aliphatic polyoxy compounds, glycidyl esters of aromatic carboxy acids and glycidyl esters of aliphatic carboxy acids.

4. The composition of claim 1, wherein R$_1$ is methyl, ethyl or propyl.

5. The composition of claim 1, wherein said aromatic group is a phenyl group, or wherein said substituted aromatic group is a phenyl group substituted by at least one member selected from the group consisting of methyl, ethyl, propyl, chlorine and bromine.

6. The composition of claim 1, wherein said urea derivative is N,N-dimethylurea, N,N-diethylurea, N-(p-chlorophenyl)-N,N'-dimethylurea, or N-(m,p-dichlorophenyl)-N,N'-dimethylurea.

7. The composition of claim 1, wherein said organic dibasic acid is present in said composition in an amount of from 10 to 100 PHR based on the amount of epoxy resin present in the composition.

8. The composition of claim 1, wherein said organic dibasic acid is present in an amount of from 15 to 50 PHR based on the amount of epoxy resin present in the composition.

9. The composition of claim 1, wherein said urea derivative is present in said composition in an amount of from 1 to 30 PHR based on the epoxy resin present in the composition.

10. The composition of claim 1, wherein said urea derivative is present in said composition in an amount of from 1 to 15 PHR based on the amount of epoxy resin present in the composition.

11. The composition of claim 3, comprising at least two of said epoxy resins.

* * * * *